United States Patent [19]

Haas et al.

[11] 4,074,018
[45] Feb. 14, 1978

[54] SECONDARY FUEL CELL

[75] Inventors: Ronald J. Haas, San Jose; Donald C. Briggs, Mountain View, both of Calif.

[73] Assignee: Ford Aerospace & Communications Corporation, Dearborn, Mich.

[21] Appl. No.: 793,906

[22] Filed: May 4, 1977

[51] Int. Cl.² .............................................. H01M 4/86
[52] U.S. Cl. .................................................... 429/21
[58] Field of Search ........................ 429/17, 12, 19, 21

[56] References Cited
U.S. PATENT DOCUMENTS

| 3,400,305 | 9/1968 | Coffman | 429/12 |
| 3,619,297 | 11/1971 | Moran | 429/17 |

Primary Examiner—John H. Mack
Assistant Examiner—H. A. Feeley
Attorney, Agent, or Firm—William E. Johnson; Keith L. Zerschling

[57] ABSTRACT

This application discloses a secondary fuel cell having improved electrode zones. Each cell has two electrode zones each containing a pair of electrode structures. A first such electrode structure in each zone is more efficient in operation during discharge of the fuel cell. Electrical structure is provided so that the first electrode structures are utilized during charging of the fuel cell and the second electrode structures are utilized during discharge of the fuel cell. The size and configuration of each of the electrode structures is a variable depending upon the particular cycle the fuel cell is to be subjected to in operation.

1 Claim, 2 Drawing Figures

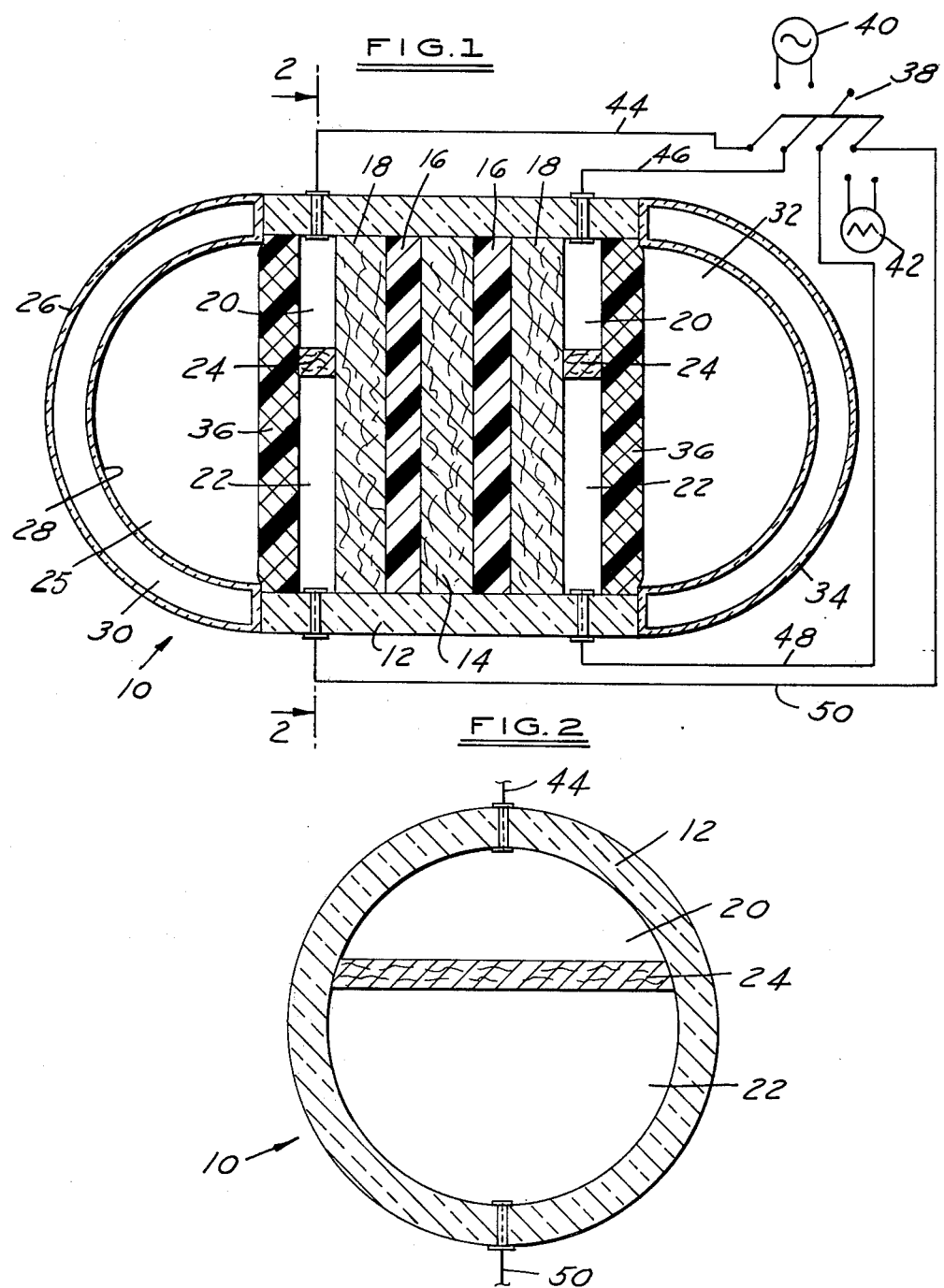

SECONDARY FUEL CELL

BACKGROUND OF THE INVENTION

In the prior art known to us, fuel cells have been formed in which the same electrodes are utilized both during charging and discharging of the cell. Fuel cells generally consist of a capillary type electrolyte retaining matrix material sandwiched between two microporous electrodes. These structures permit the establishment of a triple phase interface with a gaseous fuel and an electrolyte in a catalytic electrode pore wherein chemiabsorption takes place. The electrolyte retaining matrix provides a media for ion exchange to the counter electrode of the cell where electron transfer takes place and the electron is dissipated through an external circuit.

In the secondary or rechargeable fuel cell system, an additional reaction takes place upon recharge, namely, fuel generation. This reaction is the reverse of the reaction described above. Fuel and an oxidizing ion are generated at a catalytic electrode cite and an electrolyte ion-exchange then takes place. The oxidizing ion is then neutralized releasing fuel and an electron transfers to the external circuit.

These prior art secondary fuel cell systems are subject to frequent failure. The fuel cell system is limited in cycle life because the anodic electrode during recharge is subject to drying and catastrophic degradation.

It is an object of this present invention to provide a secondary rechargeable fuel cell system which may be charged and recharged over a prolonged lifetime.

It is still another object of this invention to provide a fuel cell system in which each electrode zone has a pair of electrodes, one being more efficient in charging and the other being more efficient in discharge cycle of the system.

The following U.S. patents were cited in a novelty study conducted on the subject matter of this invention disclosure: U.S. Pat. Nos. 3,364,071; 3,382,105; 3,471,336; 3,481,737; 3,554,909; 3,681,145; 3,719,529; 3,769,090; 3,855,002; and 3,905,832. None of the above cited patents show a structure in which pairs of electrodes are used in a fuel cell, one electrode being more efficient in charging of the cell and the other being more efficient during discharge of the cell.

SUMMARY OF THE INVENTION

This invention relates to a secondary fuel cell and, more particularly, to a secondary fuel cell having more efficient electrode structures.

In accordance with the teachings of this invention, a secondary fuel cell is formed as follows. The fuel cell has a housing in which an electrolyte retaining zone is positioned to extend across a section of the housing. An electrolyte is contained in the electrolytic retaining zone. A pair of gas impermeable, ion permeable reservoir zone are located one on each side of the electrolyte retaining zone and they also extend across the cross section of the housing. A pair of electrode zones are provided. One such zone is located on the side of each of the pair of gas impermeable, ion permeable reservoir zones not in contact with the electrolyte retraining zone. The pair of electrode structure is more efficient in operation recharge charging of the fuel cell. A second of the electrode structure is more efficient in operation during discharge of the fuel cell. A structure is secured to each end of the housing for defining gas containing zones for the fuel and the oxidant of the cell. Electrical circuitry is provided for using during charging of the cell the electrode structures more efficient in charging and for using during discharge of the cell the electrode structures more efficient in discharging.

The use of the structure of this invention provides for a more efficient operation of the fuel cell in that the electrode of proper type is used during particular periods of operation of the cell. The size of the respective charging and discharging electrodes may be tailored to the projected operational pattern of the cell. Such various cycles could be, for example, slow discharge and rapid discharge or alternatively, rapid discharge and slow recharge or any place in between these two extremes.

BRIEF DESCRIPTION OF THE DRAWINGS

FIG. 1 is a cross sectional view of a fuel cell made in accordance with the teachings of this invention.

FIG. 2 is cross sectional view taken along the line 1—1 of FIG. 1 which shows a single electrode zone for the cell.

DESCRIPTION OF THE PREFERRED EMBODIMENT

In the figures of the drawing, the fuel cell is generally identified by the numeral 10. The fuel cell includes a cylindrical housing 12 formed from stainless steel. The housing contained therebetween an electrolyte retaining zone 14 which contains a suitable electrolyte therein such as potassium hydroxide. The electrolyte retaining zone extends across the diameter of the cylindrical housing. This electrolyte retaining zone is typically compose of metal oxide fibers compressed to a density of 20% to 50% and having a thickness in the range from about 0.005 to about 0.10 inches. For sake of clarity, the drawing depicts the size of the elements in a very exaggerated manner. A suitable metal oxide for forming the zone would be alumina.

On each size of the electrolyte retaining zone 14 there is located a gas impermeable, ion permeable reservoir zone 16. This zone can be formed from a material such as a microporous polymer structure which has a thickness in the range of 0.001 to 0.020 inch and a mean pore size range from about 0.1 to 50 microns. This type of structure is exemplified by irradiated polyethylene manufactured by R.A.I. Company, Long Island, N. Y. This material permits ions to travel through to the electrolyte retaining zone 14 but does not permit gases to pass therethrough.

As shown in FIG. 1, the cell 10 has also a pair of additional electrolyte retaining zones 18. These zones are fabricated similar to the zone 14 and are optional. Use of the zones permits a greater amount of electrolyte to be stored in the fuel cell.

The next element of the cell found in each direction moving outwardly from the electrolyte retaining zone 14 is an electrode zone including upper electrodes 20 and lower electrodes 22 separated by an electrolyte retaining material 24 such as the material used to form the electrolyte retaining zone 14. In the cell shown, the upper electrode 20 is more efficient in operation during charging of the fuel cell and the lower electrode 22 is more efficient during discharge of the fuel cell. The upper electrode designed for charging can be made from a nickel sentered powder pressed to form a structure having about 80% porosity. This electrode would be 10 to 20 mils in thickness. Other metals such as silver or titanium similarly formed could be used as this electrode. This electrode is more efficient in charging because the structure has higher mechanical strength due to reduce surface area and is more durable and resistant to physical degradation for a prolonged life.

The lower electrode 22 is more efficient in operation during discharge of the cell. The lower electrode 22 may be manufactured by coating a 13 mesh nickel screen on one side with a liquid, semi-permeable catalytic mixture containing high surface area platinum black which is the catalyst. This lower electrode is more efficient than the upper electrode 20 during discharge. However, on the other hand the lower electrode 22 is less efficient in charging the cell than the upper electrode.

A hydrogen containing zone 25 is defined by end member 26 which closes one end of the cell. The end closing member has a silvered inner glass surface 28 and a vacuum region 30 to reduce loss of heat from the cell. An oxygen zone 32 is defined by an end closing member 34 of construction similar to end closing member 26. The two end closures are secured to the housing in a suitable fashion, for example, by encircling strap members (not shown). The upper and lower electrodes 20 and 22, respectively, in each of the two zones are separated from the hydrogen containing gas storage and oxygen gas storage chambers 25 and 32, respectively, by means of a gas permeable but electrolyte impermeable zone 36. This structure, for example, can be made from a porous Teflon material in which the pores are made sufficiently large to render the layer easily permeable to either gaseous hydrogen or oxygen but small enough generally to be impermeable to the electrolyte contained in the retaining zones 18 or in the porous electrodes themselves. This layer would have a thickness of about 0.001 to 0.015 inches.

A switch 38 is provided for alternatively connecting the upper electrodes 20 of the cell to a charging device 40 and the lower electrodes 22 to a load device 42 thereby to take advantage of the benefits of the structure of this invention. The upper electrodes 20 are connected by means of leads 44 and 46 to one side of the switch 38. When switch 38 is thrown to close the circuit with the charging unit 40, the charging unit operates through the switch and the leads 44 and 46 to recharge the cell. During recharging of the cell, the water of the cell is broken down to form hydrogen and oxygen which are stored in their respective storage chambers 25 and 32.

When the switch 38 is thrown in the opposite direction, the load 42 is connected by leads 48 and 50 to the lower electrodes 22. The upper electrodes 20 are as is readily apparent disconnected from the circuitry. The lower electrodes are now in a position to permit the reduction of hydrogen and oxidation of oxygen at the respective electrodes thereby to form water while consuming the hydrogen and the oxygen and, thus, producing the usable electric current which is applied to the load 32.

There has been disclosed herein a fuel cell structure in which greater electrode efficiency is obtained because the electrodes used for a particular cycle of the battery are designed specifically for that function. In view of the teachings of this specification, others will develop modifications of this invention which fall within the true spirit and scope thereof. It is intended that all such modifications be included within the scope of the appended claim.

What we claim is:

1. A secondary fuel cell which comprises:

a housing;

an electrolyte retaining zone extending across a cross section of said housing;

an electrolyte in said electrolyte retaining zone;

a pair of gas impermeable, ion permeable reservoir zones, one such zone being located on each side of said electrolyte retaining zone and extending across the cross section of said housing;

a pair of electrode zones, one such zone being located on the side of each of said pair of gas impermeable, ion permeable reservoir zones not in contact with said electrolyte retaining zone, said pair of electrode zones each containing a pair of electrode structures, a first such electrode structure being more efficient in operation during charging of the fuel cell and a second of such electrode structures being more efficient in operation during discharge of the fuel cell;

an electrolyte retaining zone with electrolyte contained therein positioned between said first electrode zone and said second electrode zone of each of said pair of electrode zones;

structure means secured to said housing for defining gas containing zones for the fuel and the oxidant of the cell;

a pair of gas permeable but electrolyte impermeable zones extending across the cross section of said housing, one such zone being located between each one of said pair of electrode zones and its associated gas containing zone; and means for using during charging of the cell said electrode more efficient in charging and for using during discharge of said cell said electrode more efficient in discharging.

* * * * *